（12）United States Patent
Eo et al.

(10) Patent No.: US 10,337,588 B2
(45) Date of Patent: Jul. 2, 2019

(54) TRANSMISSION FOR VEHICLE

(71) Applicant: Hyundai Motor Company, Seoul (KR)

(72) Inventors: Soon Ki Eo, Ansan-si (KR); Woo Churl Son, Seongnam-si (KR); Sueng Ho Lee, Seoul (KR); Ma Ru Kang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 291 days.

(21) Appl. No.: 15/350,358

(22) Filed: Nov. 14, 2016

(65) Prior Publication Data

US 2018/0031082 A1 Feb. 1, 2018

(30) Foreign Application Priority Data

Jul. 27, 2016 (KR) .................. 10-2016-0095146

(51) Int. Cl.
*F16H 3/08* (2006.01)
*F16H 3/093* (2006.01)
*F16H 3/00* (2006.01)
*F16H 3/10* (2006.01)
*F16H 37/04* (2006.01)

(52) U.S. Cl.
CPC ............ *F16H 3/093* (2013.01); *F16H 3/006* (2013.01); *F16H 3/10* (2013.01); *F16H 37/043* (2013.01); *F16H 2003/007* (2013.01); *F16H 2200/0047* (2013.01); *F16H 2200/0078* (2013.01)

(58) Field of Classification Search
CPC . F16H 3/093; F16H 3/006; F16H 3/10; F16H 37/043; F16H 2003/007
USPC .................................. 74/330, 331, 333, 340
See application file for complete search history.

(56) References Cited

U.S. PATENT DOCUMENTS

| 4,622,866 | A | * | 11/1986 | Ito | ............................ F16H 3/10 |
| | | | | | 192/48.6 |
| 9,670,991 | B2 | * | 6/2017 | Eo | ........................... F16H 3/006 |
| 2013/0263682 | A1 | * | 10/2013 | Eo | ........................... F16H 3/006 |
| | | | | | 74/331 |
| 2016/0223061 | A1 | * | 8/2016 | Park | ........................ F16H 3/006 |
| 2016/0298741 | A1 | * | 10/2016 | Eo | ........................... F16H 3/006 |

FOREIGN PATENT DOCUMENTS

| JP | 2005-195115 A | 7/2005 |
| JP | 2006-275116 A | 10/2006 |
| JP | 2013-119882 A | 6/2013 |
| KR | 10-2013-0115618 A | 10/2013 |

\* cited by examiner

*Primary Examiner* — Ha Dinh Ho
(74) *Attorney, Agent, or Firm* — Morgan, Lewis & Bockius LLP

(57) ABSTRACT

A transmission may include a first input shaft and a second input shaft receiving power from an engine continuously or through a clutch; a sub-shifting mechanism and a main shifting mechanism including a plurality of sub-shifting gear pairs and main shifting gear pairs, which have different gear ratios and are respectively engaged with two shafts of the first and second input shafts, first and second countershafts, and first and second output shafts to select the sub-shifting gear pairs and the main shifting gear pairs, a one-way clutch that transmits power from the engine only from the first countershaft to the first output shaft; a second one-way clutch that transmits power from the engine only from the second countershaft to the second output shaft; and a power transmission gear set engaged between the first output shaft and the second output shaft.

11 Claims, 2 Drawing Sheets

FIG. 2

● : Position of clutch unit for shifting to current gear stage
○ : Position of clutch unit operated in process of shifting to current gear stage

[Up-Shift]

| Gear stage | CL | SM1&3 | | | SM2&5 | | | SM4 | | SS1&3 | | | SS2&4 | | |
|---|---|---|---|---|---|---|---|---|---|---|---|---|---|---|---|
| | | GM1 | N | GM3 | GM2 | N | GM5 | N | GM4 | GS1 | N | GS3 | GS2 | N | GS4 |
| N | ● | | ● | | | ● | | ● | | | ● | | | ● | |
| 1 | ● | ● | | | | ● | | ● | | | ● | | | ● | |
| 2 | ● | ○ | ● | | ● | ○ | | ● | | ○ | ● | | | ● | |
| 3 | ● | | ○ | ● | ○ | ● | | ● | | | ● | | ○ | ● | |
| 4 | ● | | ● | ○ | | ● | | ○ | ● | | ● | ○ | | ● | |
| 5 | ● | | ● | | | ○ | ● | ● | ○ | | ● | | | ● | ○ |

TRANSMISSION FOR VEHICLE

CROSS REFERENCE TO RELATED APPLICATION

The present application claims priority to Korean Patent Application No. 10-2016-0095146, filed Jul. 27, 2016, the entire contents of which is incorporated herein for all purposes by this reference.

BACKGROUND OF THE INVENTION

Field of the Invention

The present invention relates to a transmission for a vehicle, the transmission having a compact structure without disconnection at any gear stage during shifting.

Description of the Related Art

An automated manual transmission can provide convenience for a driver, similar to an automatic transmission, by providing automatic shifting by means of an actuator while a vehicle is driven, and can contribute to improving fuel efficiency of a vehicle while maintaining power transmission efficiency higher than an automatic transmission.

The automated manual transmission is a device that automatically controls gears to shift by means of not a driver, but a TCU (Transmission Control Unit), using a hydraulic and pneumatic actuator in a manual transmission.

However, for an automated manual transmission based on a synchro-mesh type shifting mechanism, there is necessary a period where power from an engine is disconnected while automatic shifting is performed by an actuator that shifts gears, so torque is decreased and the shifting ability is deteriorated resulting in, for example, a backward pulling effect of the vehicle when shifting.

Accordingly, a technology that includes an assist clutch for specific gear stages other than a main clutch has been proposed so that shifting is performed by alternately controlling torque of the main clutch and the assist clutch, thereby preventing disconnection during shifting by preventing torque drop that is generated during shifting (similar to double clutch shifting by a DCT).

However, in this transmission, torque assist is usually possible only from the first gear to the third gear, so a driver feels disconnection when shifting into higher gear stages.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to providing a transmission for the vehicle, the transmission having a compact structure without disconnection at any gear stage during shifting.

In various aspects of the present invention, there is provided a transmission for the vehicle, the transmission including: a first input shaft continuously receiving power from the engine; a second input shaft selectively receiving power from the engine through a clutch; a sub-shifting mechanism including a plurality of sub-shifting gear pairs having different gear ratios and engaged with the first input shaft and a first countershaft, and the first input shaft and a second countershaft so that a desired gear stage is selected by selecting a sub-shifting gear pair suitable for a driving speed using a clutch unit; a main shifting mechanism including a plurality of main shifting gear pairs having different gear ratios and engaged with the second input shaft and a first output shaft, and the second input shaft and a second output shaft so that a desired gear stage is selected by selecting a main shifting gear pair suitable for a driving speed using a clutch unit; a first one-way clutch disposed on a corresponding power transmission path so that power from the engine is transmitted only from the first counter shaft to the first output shaft; a second one-way clutch disposed on a corresponding power transmission so that power from the engine is transmitted only from the second countershaft to the second output shaft; and a power transmission gear set engaged between the first output shaft and the second output shaft.

The first input shaft and the second input shaft may be coaxially arranged, the second input shaft may be a hollow shaft and the first input shaft may be inserted in the second input shaft, and the clutch may be disposed at a first end, which is relatively adjacent to the engine, of the second input shaft.

The sub-shifting gear pairs and the main shifting gear pairs may include gear pairs having a same gear ratios.

A plurality of gear pairs of the sub-shifting gear pairs may be engaged with each other through one input gear, and a plurality of gear pairs of the main shifting gear pairs may be engaged with each other through one input gear.

A sub-shifting gear pair engaged with the first input shaft and the first countershaft and a sub-shifting gear pair engaged with the first input shaft and the second countershaft may share an input gear; and a main shifting gear pair engaged with the second input shaft and the first output shaft and a main shifting gear pair engaged with the second input shaft and the second output shaft may share an input gear.

The sub-shifting gear pairs sharing the input shaft may be a first sub-shifting gear pair and a second sub-shifting gear pair; and the main shifting gear pairs sharing the input gear may be a first main shifting gear pair and a second main shifting gear pair, and a third main shifting gear pair and a fifth main shifting gear pair.

The power transmission gear set may include: a power transmission input gear on the first input shaft; a power transmission output gear on the second output shaft; and a power transmission idle gear engaged between the power transmission input gear and the power transmission output gear, and a sub-shifting gear pair engaged with the first input shaft and the first countershaft and a main shifting gear pair engaged with the second input shaft and the first output shaft may make a gear ratio for a specific gear stage by multiplying gear ratios thereof by a gear ratio of the power transmission gear set.

The first counter shaft and the first output shaft may be coaxially arranged, and the first one-way clutch may be disposed on power transmission path connected from the first countershaft to the second output shaft through the first output shaft.

A power transmission input gear may be disposed on the first output shaft, the first one-way clutch may be disposed between the power transmission input gear and the first countershaft, a power transmission output gear may be disposed on the second output shaft, and a power transmission idle gear may be engaged between the power transmission input gear and the power transmission output gear.

The second counter shaft and the second output shaft may be coaxially arranged, and the second one-way clutch may be disposed on a power transmission path connected from the second countershaft to the second output shaft.

A power transmission input gear may be disposed on the first output shaft, a power transmission output gear may be disposed on the second output shaft, the second one-way clutch may be disposed between the power transmission output gear and the second countershaft, and a power transmission idle gear may be engaged between the power transmission input gear and the power transmission output gear.

As described above, according to an exemplary embodiment of the present invention, main shifting gear pairs and sub-shifting gear pairs that are gear pairs for shifting to gear stages are doubly arranged and a torque change is absorbed through the first one-way clutch and the second one-way clutch at the points of time of shifting to the gear stages, whereby torque disconnection when shifting to higher gear stages in addition to lower gear stages is performed is prevented and thus smooth shifting can be achieved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing a shifting operation for the each of gear stages during up-shifting by the transmission of the present invention.

Figure 1:
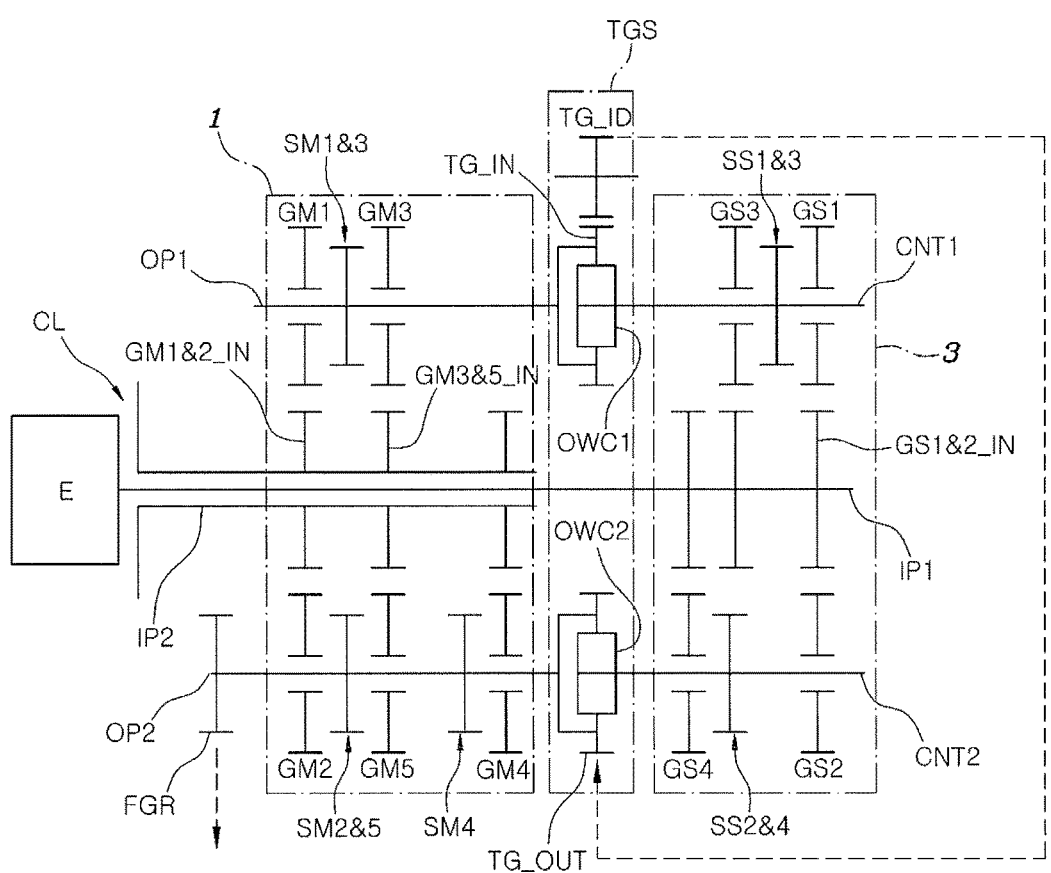
FIG. 1 is a diagram showing an exemplary configuration of a transmission for the vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described hereafter in detail with reference to the accompanying drawings.

A transmission for a vehicle of the present invention largely may include a first input shaft IP1 and a second input shaft IP2, a sub-shifting mechanism 3, a main shifting mechanism 1, first one-way clutch OWC1, a second one-way clutch OWC2, and a power transmission gear set TGS.

Referring to FIGS. 1 and 2, in detail, the first input shaft IP1 is continuously rotated by power from an engine E.

The second input shaft IP2 is selectively rotated by power from the engine E with selective engagement and disengagement of a clutch CL.

For example, the first input shaft IP1 and the second input shaft IP2 may be may be coaxially disposed, and the second input shaft IP1 may be a hollow shaft so that the first input shaft IP1 is inserted in the second input shaft IP2.

The clutch CL may be disposed at a first end, which is relatively adjacent to the engine E, of the second input shaft IP2. Further, the engine E is coupled to a first of the first input shaft IP1 directly or through a damper so that the first input shaft IP1 can be continuously rotated by the power from the engine E.

The sub-shifting mechanism 3 includes a plurality of sub-shifting gear pairs having different gear ratios and engaged with the first input shaft IP1 and a first countershaft CNT1, and the first input shaft IP1 and a second countershaft CNT2 so that a desired gear stage can be selected by selecting a sub-shifting gear pair suitable for a driving speed using a clutch unit.

For example, a specific gear stage may be selected by selecting one sub-shifting gear pair through a clutch unit disposed between two sub-shifting gear pairs or at a side of a sub-shifting gear pair. The clutch unit may be any kind of clutch unit for connecting or disconnecting power such as a synchro-mesh type synchronizer, a dog clutch, a modified dog clutch, a dry/wet clutch, an electric/electronic dry/wet magnet clutch, a coupling, a fluid coupling, and a spline.

The main shifting mechanism 1 includes a plurality of main shifting gear pairs having different gear ratios and engaged with the second input shaft IP2 and a first output shaft OP1, and the second input shaft IP2 and a second output shaft OP2 so that a desired gear stage can be selected by selecting a main shifting gear pair suitable for a driving speed using a clutch unit.

For example, a specific gear stage can be selected by selecting one main shifting gear pair through a clutch unit disposed between two main shifting gear pairs or at a side of a main shifting gear pair. The clutch unit may be any kind of clutch unit for connecting or disconnecting power such as a synchro-mesh type synchronizer, a dog clutch, a modified dog clutch, a dry/wet clutch, an electric/electronic dry/wet magnet clutch, a coupling, a fluid coupling, and a spline.

The first one-way clutch OWC1 may be disposed in a power transmission path to transmit the power of the engine E only from the first counter shaft CNT1 to the first output shaft OP1.

The second one-way clutch OWC2 may be disposed in a power transmission path to transmit the power of the engine E only from the second counter shaft CNT2 to the second output shaft OP2.

The first one-way clutch OWC1 and the second one-way clutch OWC2 that mechanically connect or disconnect power may be mechanical devices operating in the same principle, hydraulic parts or hydraulic-mechanical composite devices, or devices using electric/electromagnetic force.

Further, the power transmission gear set is engaged between the first output shaft OP1 and the second output shaft OP2 and transmits power, which is transmitted from the engine to the first output shaft OP1, to the second output shaft OP2.

That is, according to this configuration, main shifting gear pairs and sub-shifting gear pairs that are gear pairs for shifting to gear stages are doubly arranged and a torque change is absorbed through the first one-way clutch OWC1 and the second one-way clutch OWC2 at the points of time of shifting to the gear stages, whereby torque disconnection when shifting to higher gear stages in addition to lower gear stages is performed is prevented and thus smooth shifting can be achieved.

Referring to FIG. 1, the sub-shifting gear pairs and the main shifting gear pairs have gear pairs having the same gear ratio.

That is, when sub-shifting gear pairs GS1, GS2, GS3, and GS4 for first, second, third, and fourth gear ratios are provided, main shifting gear pairs GM1, GM2, GM3, and GM 4 having the same gear ratios as those of the sub-shifting gear pairs may be provided to form the first, second, third, and fourth gear ratios.

However, as for the fifth gear pair, only a main shifting gear pair may be provided without a sub-shifting gear pair.

A plurality of gear pairs of the sub-shifting gear pairs may be engaged with each other through one common input gear and a plurality of gear pairs of the main shifting gear pairs may be engaged with each other through one common input gear.

For example, a sub-shifting gear pair engaged with the first input shaft IP1 and the first countershaft CNT1 and a sub-shifting gear pair engaged with the first input shaft IP1 and the second countershaft CNT2 may share an input gear.

Further, a main shifting gear pair engaged with the second input shaft IP2 and the first output shaft OP1 and a main shifting gear pair engaged with the second input shaft IP2 and the second output shaft OP2 may share an input gear.

In detail, a sub-shifting gear pair sharing an input shaft may be a first sub-shifting gear pair GS1 and a second sub-shifting gear pair GS2 and, a main shifting gear pair sharing an input gear may be a first main shifting gear pair GM1 and a second main shifting gear pair GM2 and, a third main shifting gear pair GM3 and a fifth main shifting gear pair GM5.

That is, the first sub-shifting gear pair GS1 and the second sub-shifting gear pair GS2 share a 1&2 sub-shifting common input gear GS1&2_IN on the first input shaft IP1, the first main shifting gear pair GM1 and the second main shifting gear pair GM2 share a 1&2 main shifting common input gear GM1&2_IN on the second input shaft IP2, and the third main shifting gear pair GM3 and the fifth main shifting gear pair GM5 share a 3&5 main shifting common input gear GM3&5_IN on the second input shaft IP2.

Further, a sub-shifting 1&3 clutch unit SS1&3 is disposed between an output gear of the first sub-shifting gear pair GS1 and an output gear of the third sub-shifting gear pair GS3, so one of the two sub-shifting gear pairs GS1 and GS3 can be selected. Further, a sub-shifting 2&4 clutch unit SS2&4 is disposed between an output gear of the second sub-shifting gear pair GS2 and an output gear of the fourth sub-shifting gear pair GS4, so one of the two sub-shifting gear pairs GS2 and GS4 can be selected.

Further, a main shifting 1&3 clutch unit SM1&3 is disposed between an output gear of the first main shifting gear pair GM1 and an output gear of the third main shifting gear pair GM3, so one of the two main shifting gear pairs GM1 and GM3 can be selected. Further, a main shifting 2&5 clutch unit SM2&5 is disposed between an output gear of the second main shifting gear pair GM2 and an output gear of the fifth main shifting gear pair GM5, so one of the two main shifting gear pairs GM2 and GM5 can be selected.

Further, a main shifting fourth clutch unit SM4 is disposed at a side of the fourth main shifting gear pair GM4, so the fourth main shifting gear pair GM4 can be selected.

That is, according to this configuration, two gear pairs share one input gear, so it is possible to suppress shifting shock at all gear stages without increasing the entire length.

Further, the power transmission gear set TGS may include a power transmission input gear TG_IN on the first output shaft OP1, a power transmission output gear TG_OUT on the second output shaft OP2, and a power transmission idle gear TG_ID engaged between the power transmission input gear TG_IN and the power transmission output gear TG_OUT.

The sub-shifting gear pairs engaged with the first input shaft IP1 and the first countershaft CNT1 and the main shifting gear pairs engaged with the input shaft IP2 and the first output shaft OP1 can make a gear ratio for a specific gear stage as the product of the gear ratios thereof and the gear ratio of the power transmission gear set TGS.

For example, it is possible to make the first gear ratio by multiplying the gear ratio of the first main shifting gear pair GM1 by the gear ratio of the power transmission gear set TGS and it is possible to make the third gear ratio by multiplying the gear ratio of the third main shifting gear pair GM3 by the gear ratio of the power transmission gear set TGS.

Similarly, it is possible to make the first gear ratio by multiplying the gear ratio of the first sub-shifting gear pair GS1 by the gear ratio of the power transmission gear set TGS and it is possible to make the third gear ratio by multiplying the gear ratio of the third sub-shifting gear pair GS3 by the gear ratio of the power transmission gear set TGS.

It may be advantageous in terms of designing gear ratios to make the product of the gear ratio of the first main shifting gear pair GM1 and the gear ratio of the power transmission gear set TGS the same as the gear ratio of the second main shifting gear pair GM2 and to make the product of the gear ratio of the third main shifting gear pair GM3 and the gear ratio of the power transmission gear set TGS the same as the gear ratio of the fifth main shifting gear pair GM5.

That is, the first gear ratio is relatively large, so the diameter of the first output gear is large. Accordingly, when the gear ratio of the power transmission gear set TGS is used to make the first gear ratio, it is possible to make the first gear ratio large even without excessively increasing the diameter of the first output gear, and accordingly, it is possible to reduce a size of the transmission.

A final reduction gear FGR connected to a differential may be disposed on the second output shaft OP2.

Further, the first output shaft OP1 and the first countershaft CNT1 are coaxially disposed to face each other and the first one-way clutch OWC1 may be disposed on the path connected from the first countershaft CNT1 to the second output shaft OP2 through the first output shaft OP1. Accordingly, a configuration for transmitting power from the first countershaft CNT1 to the second output shaft OP2 can be further provided.

This configuration can be achieved by the power transmission gear set TGS described above. In detail, the power transmission input gear TG_IN may be disposed at a first end of the first output shaft OP1 and the first one-way clutch OWC1 may be disposed between the power transmission input gear TG_IN and the first countershaft CNT1. For example, the outer circumference of the first one-way clutch OWC may be fixed to the power transmission input gear TG_IN and the inner circumference of the first one-way clutch OWC1 may be fixed to the first countershaft CNT1.

Further, the power transmission output gear TG_OUT may be disposed on the second input shaft OP2 and the power transmission idle gear TG_ID may be engaged between the power transmission input gear TG_IN and the power transmission output gear TG_OUT.

That is, the power transmitted to the first countershaft CNT1 from the engine E is transmitted to the power transmission input gear TG_IN through the first one-way clutch OWC1, so this power transmission path can be connected to the differential through the power transmission idle gear TG_ID and the power transmission output gear TG_OUT and then through the final reduction gear FGR on the second output shaft OP2.

In particular, when the first countershaft CNT1 is larger in rotational speed than the power transmission input gear TG_IN, the difference of the rotational speeds is absorbed through the first one-way clutch OWC1, so the first countershaft CNT1 can be relatively rotated.

Further, the second countershaft CNT2 and the second output shaft OP2 may be coaxially disposed to face each other and the second one-way clutch OWC may be disposed on the power transmission path from the second countershaft CNT2 to the second output shaft OP2.

For example, the second one-way clutch OWC2 may be disposed between the power transmission output gear TG_OUT and the second countershaft CNT2, in which the outer circumference of the second one-way clutch OWC2 may be fixed to the power transmission output gear TG_OUT and the inner circumference of the second one-way clutch OWC2 may be fixed to the second countershaft CNT2.

That is, the power transmitted to the second countershaft CNT2 from the engine E is transmitted to the power transmission output gear TG_OUT through the second one-way clutch OWC2, so this power transmission path can be connected to the differential through the final reduction gear FGR on the second output shaft OP2.

In particular, when the second countershaft CNT2 is larger in rotational speed than the power transmission output gear TG_OUT, the difference of the rotational speeds is absorbed through the second one-way clutch OWC2, so the second countershaft CNT2 can be relatively rotated.

Shifting relationships among some gear stages by the transmission of the present invention are described hereafter.

Referring to FIGS. 1 and 2, the first sub-shifting gear pair GM1 is selected using the main shifting 1&e clutch unit SM1&3 to drive a vehicle in the first gear stage.

In this state, when the clutch CL is engaged, the power from the engine is transmitted to the second output shaft OP2 through the first main shifting gear pair GM1 and the power transmission gear set TGS, so the vehicle can be driven in the first gear stage.

Further, the first sub-shifting gear pair GS1 is selected using the sub-shifting 1&3 clutch unit SS1&3 to shift up from the first gear stage to the second gear stage. Since the first main shifting gear pair GM1 and the first sub-shifting gear pair GS1 have the same gear ratio, so they can rotated without interlocking.

Further, the clutch CL is disengaged and the main shifting 1&3 clutch unit SM1&3 is disengaged from the first main shifting gear pair GM1. However, even though the clutch CL and the main shifting 1&3 clutch unit SM1&3 are disengaged, the power from the engine E keeps being transmitted through the first sub-shifting gear pair GS1 and the first countershaft CNT1 rotates while pulling the power transmission input gear TG_IN through the first one-way clutch OWC1. Accordingly, the vehicle can keep driven in the first gear stage by the power from the engine E.

Thereafter, the second main shifting gear pair GM2 is selected using the main shifting 2&5 clutch unit SM2&5 and the clutch CL is engaged, whereby the vehicle can be driven in the second gear stage by the power from the engine E.

In particular, at the moment of engaging the clutch CL, the rotational speed transmitted to the power transmission input gear TG_IN through the second output shaft OP2 at the gear ratio of the second main shifting gear pair GM2 is larger than the rotational speed transmitted to the first countershaft CNT1 at the gear ratio of the first sub-shifting gear pair GS1, so the difference of the rotational speeds is absorbed through the first one-way clutch OWC1, thereby preventing interlocking.

Further, the second sub-shifting gear pair GS2 is selected using the sub-shifting 2&4 clutch unit SS2&4 to shift up from the second gear stage to the third gear stage. Since the second main shifting gear pair GM2 and the second sub-shifting gear pair GS2 have the same gear ratio, so they can rotated without interlocking.

Further, the clutch CL is disengaged and then the main shifting 2&5 clutch unit SM2&5 is disengaged from the second main shifting gear pair GM2. As described above, the power from the engine E keeps being transmitted through the second sub-shifting gear pair GS2 and the second countershaft CNT2 rotates while pulling the power transmission output gear TG_OUT through the second one-way clutch OWC2, so the vehicle can keep being driven in the second gear stage by the power from the engine E.

Thereafter, the third main shifting gear pair GM3 is selected using the main shifting 1&3 clutch unit SM1&3 and the clutch CL is engaged, whereby the vehicle can be driven in the third gear stage by the power from the engine E.

In particular, at the moment of engaging the clutch CL, the rotational speed transmitted to the power transmission output gear TG_OUT through the first output shaft OP1 at the gear ratio of the third main shifting gear pair GM3 is larger than the rotational speed transmitted to the second countershaft CNT2 at the gear ratio of the second sub-shifting gear pair GS2, so the difference of the rotational speeds is absorbed through the second one-way clutch OWC2, thereby preventing interlocking.

Further, shifting up from the third gear stage to the fourth gear stage and shifting up from the fourth gear stage to the fifth gear stage are made in the same way as described above, so shifting can be stably performed to all gear stages without shifting shock.

On the other hand, down-shifting can be performed through single clutch shifting.

For example, in order to shift down from the third gear stage to the second gear stage, the clutch CL is disengaged and then the main shifting 1&3 clutch unit SM1&3 is disengaged from the third main shifting gear pair GM3. Thereafter, the second main shifting gear pair GM2 is engaged using the main shifting 2&5 clutch unit SM2&5 and the clutch CL is engaged, whereby the vehicle can be driven in the second gear stage.

As described above, according to an exemplary embodiment of the present invention, main shifting gear pairs and sub-shifting gear pairs that are gear pairs for shifting to gear stages are doubly arranged and a torque change is absorbed through the first one-way clutch OWC1 and the second one-way clutch OWC2 at the points of time of shifting to the gear stages, whereby torque disconnection when shifting to higher gear stages in addition to lower gear stages is performed is prevented and thus smooth shifting can be achieved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
   a first input shaft continuously receiving power from an engine;
   a second input shaft selectively receiving power from the engine through a clutch;
   a sub-shifting mechanism including a plurality of sub-shifting gear pairs having different gear ratios and engaged with the first input shaft and a first countershaft, and the first input shaft and a second countershaft so that a desired gear stage is selected by selecting a sub-shifting gear pair suitable for a driving speed using a sub-shifting clutch unit;
   a main shifting mechanism including a plurality of main shifting gear pairs having different gear ratios and engaged with the second input shaft and a first output shaft, and the second input shaft and a second output shaft so that a desired gear stage is selected by selecting a main shifting gear pair suitable for a driving speed using a main shafting clutch unit;
   a first one-way clutch disposed on a corresponding power transmission path so that power from the engine is transmitted only from the first counter shaft to the first output shaft;
   a second one-way clutch disposed on a corresponding power transmission path so that power from the engine is transmitted only from the second countershaft to the second output shaft; and
   a power transmission gear set engaged between the first output shaft and the second output shaft.

2. The transmission of claim 1, wherein the first input shaft and the second input shaft are coaxially arranged,
   the second input shaft is a hollow shaft and the first input shaft is inserted in the second input shaft, and
   the clutch is disposed at a first end, which is relatively adjacent to the engine, of the second input shaft.

3. The transmission of claim 1, wherein the sub-shifting gear pairs and the main shifting gear pairs include gear pairs having same gear ratios.

4. The transmission of claim 3, wherein a plurality of gear pairs of the sub-shifting gear pairs is engaged with each other through a sub-shifting common input gear, and a plurality of gear pairs of the main shifting gear pairs is engaged with each other through a main shifting common input gear.

5. The transmission of claim 4, wherein a sub-shifting gear pair engaged with the first input shaft and the first countershaft and a sub-shifting gear pair engaged with the first input shaft and the second countershaft share the sub shifting common input gear, and
   a main shifting gear pair engaged with the second input shaft and the first output shaft and a main shifting gear pair engaged with the second input shaft and the second output shaft share the main shifting common input gear.

6. The transmission of claim 5, wherein the sub-shifting gear pairs sharing the sub shifting common input shaft are a first sub-shifting gear pair and a second sub-shifting gear pair, and
   the main shifting gear pairs sharing the main shifting common input gear are a first main shifting gear pair and a second main shifting gear pair, and a third main shifting gear pair and a fifth main shifting gear pair.

7. The transmission of claim 3, wherein the power transmission gear set includes: a power transmission input gear on the first output shaft; a power transmission output gear on the second output shaft; and a power transmission idle gear engaged between the power transmission input gear and the power transmission output gear, and
   a sub-shifting gear pair engaged with the first input shaft and the first countershaft and a main shifting gear pair engaged with the second input shaft and the first output shaft make a gear ratio for a predetermined gear stage by multiplying gear ratios thereof by a gear ratio of the power transmission gear set.

8. The transmission of claim 1, wherein the first counter shaft and the first output shaft are coaxially arranged, and
   the first one-way clutch is disposed on a power transmission path connected from the first countershaft to the second output shaft through the first output shaft.

9. The transmission of claim 8, wherein a power transmission input gear is disposed on the first output shaft,
   the first one-way clutch is disposed between the power transmission input gear and the first countershaft,
   a power transmission output gear is disposed on the second output shaft, and
   a power transmission idle gear is engaged between the power transmission input gear and the power transmission output gear.

10. The transmission of claim 1, wherein the second counter shaft and the second output shaft are coaxially arranged, and
    the second one-way clutch is disposed on a power transmission path connected from the second countershaft to the second output shaft.

11. The transmission of claim 10, wherein a power transmission input gear is disposed on the first output shaft,
    a power transmission output gear is disposed on the second output shaft,
    the second one-way clutch is disposed between the power transmission output gear and the second countershaft, and
    a power transmission idle gear is engaged between the power transmission input gear and the power transmission output gear.

* * * * *